(12) United States Patent
Kowarz et al.

(10) Patent No.: US 7,046,446 B1
(45) Date of Patent: May 16, 2006

(54) SPECKLE REDUCTION FOR DISPLAY SYSTEM WITH ELECTROMECHANICAL GRATING

(75) Inventors: Marek W. Kowarz, Henrietta, NY (US); Farouk H. Bonilla, Webster, NY (US); Brian E. Kruschwitz, Rochester, NY (US); James G. Phalen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/012,967

(22) Filed: Dec. 15, 2004

(51) Int. Cl.
*G02B 27/10* (2006.01)
*G02F 1/01* (2006.01)
*G02F 1/07* (2006.01)

(52) U.S. Cl. .................. 359/618; 359/245; 359/279
(58) Field of Classification Search .............. 359/15, 359/292, 245, 242, 279, 618, 634; 347/129, 347/143; 353/32, 34, 37, 69, 70
See application file for complete search history.

(56) References Cited

U.S. PATENT DOCUMENTS

| | | | |
|---|---|---|---|
| 4,143,943 A | 3/1979 | Rawson | 350/120 |
| 4,706,114 A * | 11/1987 | Cross | 348/266 |
| 4,970,546 A * | 11/1990 | Suzuki et al. | 355/53 |
| 5,311,360 A | 5/1994 | Bloom et al. | 359/572 |
| 5,313,479 A | 5/1994 | Florence | 372/26 |
| 5,982,553 A | 11/1999 | Bloom et al. | 359/627 |
| 6,307,663 B1 | 10/2001 | Kowarz | 359/231 |
| 6,323,984 B1 * | 11/2001 | Trisnadi | 359/245 |
| 6,411,425 B1 | 6/2002 | Kowarz et al. | 359/291 |
| 6,476,848 B1 | 11/2002 | Kowarz et al. | 347/255 |
| 6,577,429 B1 | 6/2003 | Kurtz et al. | 359/279 |
| 6,747,781 B1 | 6/2004 | Trisnadi | 359/279 |
| 2001/0053004 A1 * | 12/2001 | Nishikawa et al. | 359/15 |

* cited by examiner

*Primary Examiner*—Ricky L. Mack
*Assistant Examiner*—Jerry Fang
(74) *Attorney, Agent, or Firm*—Stephen H. Shaw

(57) ABSTRACT

A method for displaying an image including: forming at least three light beams by diffraction at a single linear light modulator, wherein the at least three light beams have substantially equal intensity and are substantially the same color; projecting the at least three light beams toward a display surface to form an image line; and, scanning the image line across the display surface to form an image thereby.

24 Claims, 11 Drawing Sheets

SPECKLE REDUCTION FOR DISPLAY SYSTEM WITH ELECTROMECHANICAL GRATING

FIELD OF THE INVENTION

This invention relates to a display system with a linear array of electromechanical grating devices, scanned in order to generate a two-dimensional image. More particularly, the invention relates to an improved display system using an electromechanical grating device and methods for reducing speckle in the displayed image.

BACKGROUND OF THE INVENTION

Spatial Light Modulators (SLMs) based on electromechanical grating devices have been adapted to a wide range of applications, including display, data storage, spectroscopy and printing. Such systems typically use large numbers of individually addressable devices in either a linear array or an area array, with over a million addressable devices desirable for an area modulator array in a high-quality display.

Linear arrays are particularly advantaged over their area array counterparts by virtue of higher resolution, reduced cost, and simplified optics. One advantage of particular interest: linear arrays are more suitable modulators for laser light than are many of their two-dimensional counterparts, such as liquid crystal-based modulators. Grating Light Valve (GLV) linear arrays, as described in U.S. Pat. No. 5,311,360 (Bloom et al.) are one earlier type of linear array, for example, that offers a workable solution for high-brightness imaging, using laser sources. Another experimental type of linear array just recently disclosed and in early development stages is the flexible micromirror linear array, as described in the article "Flexible micromirror linear array for high resolution projection display" by Francis Picard, et al. in *MOEMS Display and Imaging Systems, Proceedings of SPIE* Vol. 4985 (2003). The prototype flexible micromirror linear array described in the Picard et al. article employs a line of reflective "microbridges" which are individually switched to modulate light to form a linear image.

Recently, an electromechanical conformal grating device including ribbon elements suspended above a substrate by a periodic sequence of intermediate supports was disclosed by Kowarz in U.S. Pat. No. 6,307,663, issued on Oct. 23, 2001, entitled "SPATIAL LIGHT MODULATOR WITH CONFORMAL GRATING DEVICE." The electromechanical conformal grating device is operated by electrostatic actuation, which causes the ribbon elements to conform around the support substructure, thereby producing a grating. The device of '663 has more recently become known as the conformal GEMS device or, more simply, the GEMS device, with 'GEMS' standing for 'grating electromechanical system'. The GEMS device possesses a number of attractive features. It provides high-speed digital light modulation with high contrast and good efficiency. In addition, in a linear array of GEMS devices, the active region is relatively large and the grating period is oriented perpendicular to the array direction. This angular orientation of the grating period causes diffracted light beams to separate in close proximity to the linear array and to remain spatially separated throughout most of an optical system, and enables a simpler optical system design with smaller optical elements.

Display systems based on a linear array of GEMS devices are disclosed by Kowarz et al. in U.S. Pat. No. 6,411,425, entitled "ELECTROMECHANICAL GRATING DISPLAY SYSTEM WITH SPATIALLY SEPARATED LIGHT BEAMS," issued Jun. 25, 2002 and by Kowarz et al. in U.S. Pat. No. 6,476,848, entitled "ELECTROMECHANICAL GRATING DISPLAY SYSTEM WITH SEGMENTED WAVEPLATE," issued Nov. 5, 2002. Display systems based on GLV devices are disclosed in U.S. Pat. No. 5,982,553, entitled "DISPLAY DEVICE INCORPORATING ONE-DIMENSIONAL GRATING LIGHT-VALVE ARRAY" issued to Bloom et al. on Nov. 9, 1999.

Current color display system architectures for electromechanical grating devices of both GLV and GEMS types generally employ three separate color paths, Red, Green, and Blue (RGB), wherein each color path is provided with a linear array of electromechanical grating devices. Each linear array of electromechanical grating devices modulates its corresponding component red, green, or blue laser light. The resulting modulated light beams are then combined onto the same output axis. A full-color image is formed by scanning the modulated light beams across a display screen. Referring to FIG. 1, there is shown, in simplified block diagram form, a prior art display system 10 using three separate optical paths for a GEMS device. (An embodiment using a GLV device would also employ three color paths, but require a more complex arrangement of components.)

For red color modulation in a red modulation assembly 120$r$, a red light source 70$r$, typically a laser, provides illumination that is conditioned through a spherical lens 72$r$ and a cylindrical lens 74$r$ and directed towards a turning mirror 82$r$. Light reflected from turning mirror 82$r$ is modulated by diffraction at an electromechanical grating light modulator 85$r$. Modulated diffracted light from electromechanical grating light modulator 85$r$ is diffracted past turning mirror 82$r$ and to a color combiner 100, such as an X-cube or other dichroic combiner. The modulated light from color combiner 100 is then directed by a lens 75, through an optional cross-order filter 110 (not shown), to a scanning mirror 77 for projection onto a display surface 90. Green color modulation in a green modulation assembly 120$g$ uses a similar set of components for providing light to color combiner 100, with a green light source 70$g$, typically a laser, providing illumination through a spherical lens 72$g$ and a cylindrical lens 74$g$ and directed towards a turning mirror 82$g$. Light reflected from turning mirror 82$g$ is modulated by diffraction at an electromechanical grating light modulator 85$g$. Modulated diffracted light from electromechanical grating light modulator 85$g$ is diffracted past turning mirror 82$g$ and to color combiner 100. Similarly, in a blue modulation assembly 120$b$, blue light source 70$b$, typically a laser, provides illumination through a spherical lens 72$b$ and a cylindrical lens 74$b$ and directs light towards a turning mirror 82$b$. Light reflected from turning mirror 82$b$ is modulated by diffraction at an electromechanical grating light modulator 85$b$, diffracted past turning mirror 82$b$ and to color combiner 100. In each color channel, turning mirror 82$r$, 82$g$, or 82$b$, acts as an obstructing element for blocking the reflected zeroeth order light from its respective electromechanical grating light modulator 85$r$, 85$g$, or 85$b$.

The arrangement of components of FIG. 1 has been shown to provide full-color images having high spatial resolution, with excellent bit depth, high brightness, good contrast, and a broad color gamut when light sources 70$r$, 70$g$, and 70$b$ are lasers. However, one problem that is common to systems using electromechanical grating light modulators with lasers or, more generally, used with highly coherent light sources, is speckle. Speckle is quantified in terms of contrast, C, given in percent as:

$$C = 100 * \left(\frac{I_{std}}{I_{mean}}\right)$$

wherein $I_{std}$ is a standard deviation of intensity fluctuation about a mean intensity $I_{mean}$. The speckle contrast for fully developed speckle is 100%. A result of perceived interference effects from scattering of the illuminating laser light by surface or volume scatterers of the projection screen, speckle reduces the ability of an imaging system to resolve fine spatial detail and causes levels of noise in an image that can be highly visually annoying. At worst, without some form of correction, speckle can be sufficiently objectionable to make coherent illumination unsuitable for display purposes. As a rule-of-thumb, visually pleasing images should have a speckle contrast of less than about 10%.

There have been a number of methods employed for reducing speckle effects in imaging displays. Conventional strategies for speckle reduction include modifying the spatial or temporal coherence of the illumination or modifying its polarization state. One method provides vibration or oscillatory movement of the display screen. With oscillation above a threshold speed, perceived speckle can be significantly reduced. Other methods include broadening the spectral line width of the laser illumination and reducing the spatial coherence by using static and oscillating diffusers or oscillating fibers or by vibrating various optical components in the path of illumination or imaging light.

Examples of proposed solutions that could be adapted for limiting speckle in systems employing electromechanical grating devices include the following:

U.S. Pat. No. 6,747,781 entitled "METHOD, APPARATUS, AND DIFFUSER FOR REDUCING LASER SPECKLE" to Trisnadi et al. discloses moving a diffusing element that is positioned at an intermediate image plane that subdivides image pixels into smaller cells having different temporal phase;

Commonly assigned U.S. Pat. No. 6,577,429 entitled "LASER PROJECTION DISPLAY SYSTEM" to Kurtz et al. discloses using an electronically controllable despeckling modulator to provide controllable, locally randomized phase changes with a linear SLM;

U.S. Pat. No. 6,323,984 entitled "METHOD AND APPARATUS FOR REDUCING LASER SPECKLE" to Trisnadi et al. discloses speckle reduction using a wavefront modulator in the image plane;

U.S. Pat. No. 5,313,479 entitled "SPECKLE-FREE DISPLAY SYSTEM USING COHERENT LIGHT" to Florence discloses illumination of a light valve through a rotating diffuser; and, U.S. Pat. No. 4,256,363 entitled "SPECKLE SUPPRESSION OF HOLOGRAPHIC MICROSCOPY" to Briones and U.S. Pat. No. 4,143,943 entitled "REAR PROJECTION SCREEN SYSTEM" to Rawson disclose apparatus that reduce speckle by moving diffusive components in the projection path.

While conventional methods for speckle reduction may have some applicability to laser projection systems using GEMS and other types of electromechanical grating devices, there are drawbacks to these approaches that constrain image quality and reduce overall contrast as well as adding cost and complexity to projection apparatus. Speckle remains a problem, therefore, that is only mitigated to some degree using conventional procedures. Thus, it can be seen that there would be benefits to a display apparatus employing electromechanical grating device technology that provides reduced speckle without the addition of separate diffusing or polarizing components.

SUMMARY OF THE INVENTION

The present invention is directed to overcoming one or more of the problems set forth above. Briefly summarized, according to one aspect, the present invention provides a method for displaying an image including: forming at least three light beams by diffraction at a single linear light modulator, wherein the at least three light beams have substantially equal intensity and are substantially the same color; projecting the at least three light beams toward a display surface to form an image line; and scanning the image line across the display surface to form an image thereby.

A second aspect of the present invention provides a display system comprising:

a) a light source providing a substantially coherent illumination beam;

b) a linear light modulator comprising at least one linear array of light modulating devices for forming a modulated beam from the illumination beam, wherein the modulated beam comprising a plurality of orders of diffracted light from the illumination beam; and wherein the intensity of first order diffracted light is less than or equal to the summed intensity of second and higher order diffracted light.

A third aspect of the present invention provides a linear light modulator for providing reduced speckle, comprising:

at least one linear array of light modulating devices for forming a modulated beam from an illumination beam, the modulated beam comprising a plurality of orders of diffracted light from the illumination beam; and wherein the intensity of first order diffracted light is less than or equal to the summed intensity of second and higher order diffracted light.

A fourth aspect of the present invention provides a linear light modulator for providing reduced speckle, comprising:

at least one linear array of light modulating devices for forming a modulated beam from an illumination beam, the modulated beam comprising a plurality of orders of diffracted light from the illumination beam; and wherein the intensity of a second order diffracted light is greater than or equal to one half of the intensity of a first order diffracted light.

It is a feature of the present invention that in a number of disclosed embodiments, herein, the present invention utilizes multiple diffracted orders of light for reducing speckle effects.

It is an advantage of the present invention that it provides a display system using one or more arrays of electromechanical grating devices that generate a reduced level of speckle.

It is an advantage of the present invention that it provides a full-color display system using arrays of electromechanical grating devices with a reduced number of components, allowing design of a more compact and lower cost apparatus than provided by earlier designs. With a reduced number of components and minimized requirements for adjustment, the apparatus of the present invention provides a robust solution for imaging using electromechanical grating array devices.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

To facilitate understanding, identical reference numerals have been used, where possible, to designate identical elements that are common to the figures.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

For the description that follows, components specific to a single color path may be more particularly identified with a letter appended to the part number. Where used, letters correspond to color paths; for example, "r" is appended for red, "b" for blue, "g" for green. Where the description applies to these imaging path components in general, however, the part number may be given without an appended letter.

The apparatus and method of the present invention take advantage of inherent characteristics of electromechanical grating light modulators for providing a display apparatus having significantly reduced speckle. Due to the high performance of GEMS devices, the adaptation of these devices with reduced speckle is of particular interest. The approaches used by this invention can also be used in combination with other, more conventional strategies for speckle reduction and for GLV and other devices, as given in the background section above. In any case, conventional methods must be adapted to the environment and functions of the specific type of linear modulator that is used.

Embodiments Using Anamorphic Distortion

Figure 1:
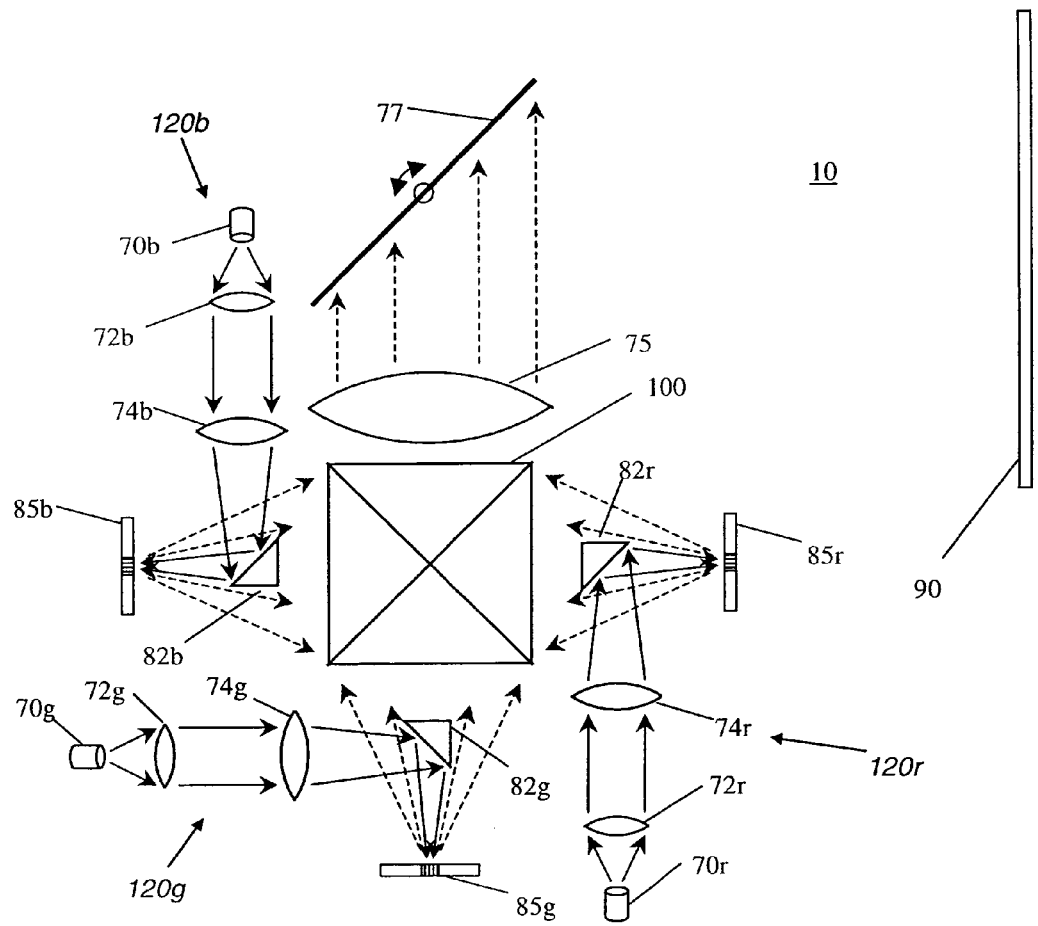
FIG. 1 is a prior art schematic block diagram showing a display apparatus employing an electromechanical grating light modulator in each of three color modulation channels.

Recalling the basic projection operation summarized with respect to FIG. 1, speckle has been shown to have a spatial characteristic width that is approximately equal to the resolvable spot size of the observer. If the modulated, scanned image line can be narrowed, speckle is reduced due to the change in interference as the image line is scanned across the speckle area. This narrowing effect can be accomplished by focusing the image line onto display surface 90 in the scan direction through a larger exit pupil. This is analogous to reducing the coherence of the modulated light by increasing the size of the exit pupil.

Figure 2:
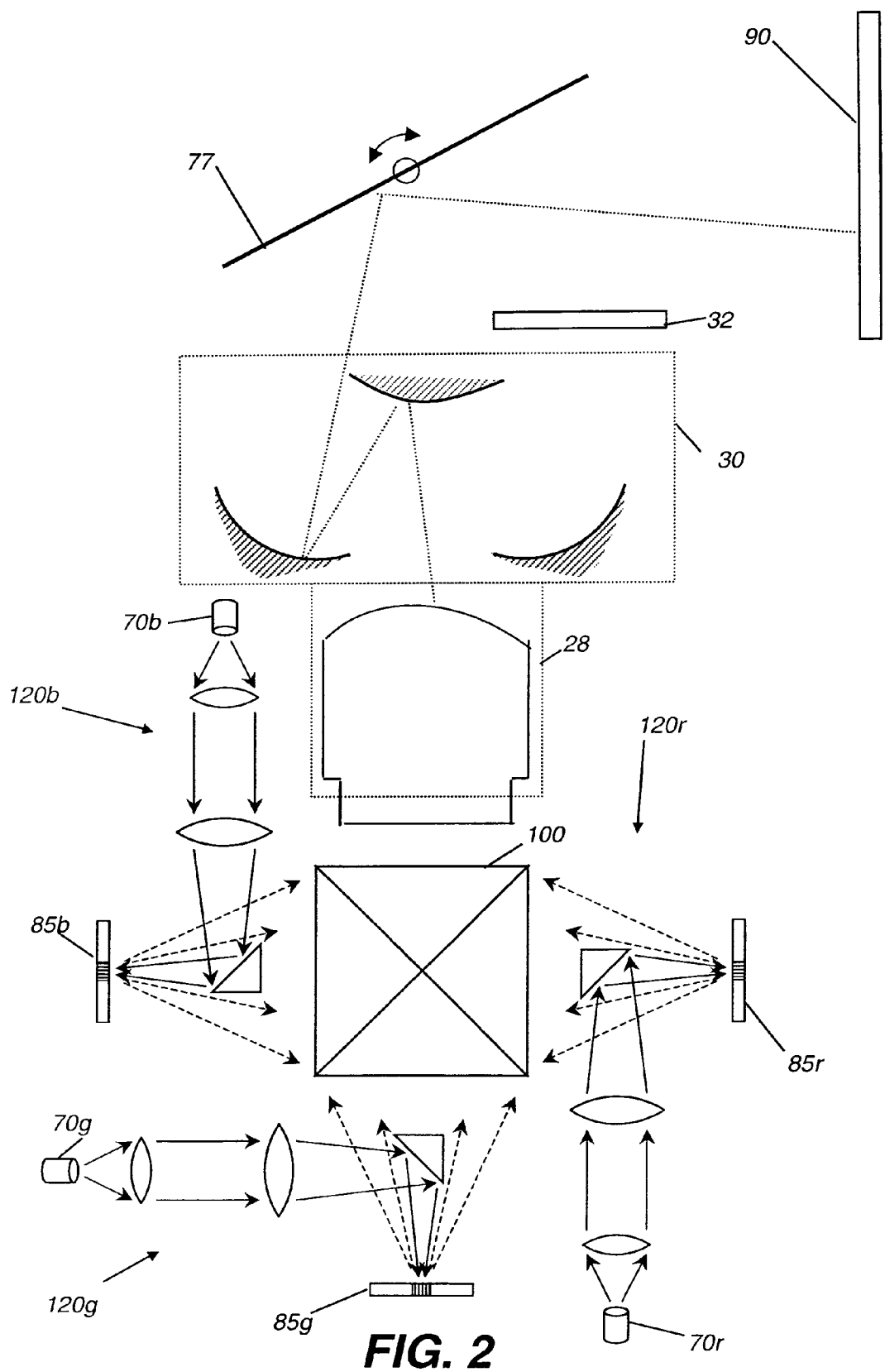
FIG. 2 is a schematic block diagram showing the arrangement of a display apparatus in one embodiment of the present invention.

A first strategy for speckle reduction, then, is to anamorphically reshape the width of the scanned image line. Referring to FIG. 2, there is shown an embodiment of display system 10 that provides a favorable level of anamorphic distortion for reducing speckle by conditioning the image line, narrowing the imaged line width. In this embodiment, red, green, and blue modulation assemblies 120r, 120g, and 120b each operate to modulate light, which is combined along a single path by color combiner 100. A projection lens 28 directs this combined light toward scanning mirror 77 and display surface 90 through an angle-transforming optical assembly 30. Angle-transforming optical assembly 30 may take any of a number of forms, using refractive or reflective optics, anamorphic lenses, and the like. For example, angle-transforming optical assembly 30 may utilize cylindrical mirrors. It is instructive to note that, unlike anamorphic optics conventionally used with film projectors that reshape the complete projected image frame, thereby adapting the film format for the dimensions of a display screen, the arrangement of anamorphic optics in angle-transforming optical assembly 30 transforms only the projected line. An optional half-wave plate 32 may alternately be used, as shown in FIG. 2, to rotate the polarization for some portion of the modulated light output, providing additional speckle reduction thereby. The optional waveplate can be disposed at any location in the path of the modulated light where the diffracted orders are spatially separated prior to scanning mirror 77.

Anamorphic distortion of the individual line image by angle-transforming optical assembly 30 also helps to compensate for the slightly elongated pixel shape that is output from electromechanical grating devices. A number of alternative arrangements of anamorphic optics are also possible for conditioning the image line. Referring to the block diagram of FIG. 3, there is shown a configuration using a more conventional arrangement of anamorphic optics, in which projection lens 28 itself provides anamorphic distortion for conditioning the image line, while reshaping the entire image. As in the embodiments of FIGS. 1 and 2, red, green, and blue modulation assemblies 120*r*, 120*g*, and 120*b* each operate to modulate light, which is combined along a single path by color combiner 100 and directed to scanning mirror 77 by a lens 76. Scanning mirror 77 directs this light through lens 75 to an intermediate image plane 34, disposed about the focal point of projection lens 28. An optional diffuser 36 may be disposed along intermediate image plane 34.

In addition to providing, to the projected image line, a distortion that is favorable for pixel shape, anamorphic projection of the imaging light by angle-transforming optical assembly 30 also reduces speckle effects by increasing the angle of the projected light that forms each line of the projected image. In this way, such anamorphic optics form the projected image line at a lower f-number. The high angular orientation of the projected light is favorable for speckle reduction; the concept of providing an increased light angle is also employed in subsequent embodiments.

It must be observed that the geometry of GEMS projection is suited to speckle reduction using anamorphic optics. For the GEMS device, the angle between any two of the plurality of orders of diffracted light in the modulated beam is in a plane that is perpendicular to the longest axis of the linear light modulator. That is, for the GEMS device, the angle between any two of the plurality of orders of diffracted light in the modulated beam is in the plane that contains the scan angle of scanning mirror 77. For example, with respect to FIG. 2, the scan angle of scanning mirror 77 is in the plane of the page. Anamorphic conditioning of the scanned line in the scan direction, therefore, has an effect on the relative angles of diffracted orders. For the GLV device, on the other hand, the angle between different diffracted orders is in the plane of the scanned image line; this is perpendicular to the case for the GEMS device. Thus, anamorphic conditioning would be less beneficial for GLV speckle reduction.

GEMS Embodiments Using Multiple Diffracted Orders

The inventors have discovered that forming a line image with an increased number of diffracted orders effectively reduces speckle when the additional diffracted orders are distributed along the scan direction. This capability is readily available with GEMS technology; GLV technology, on the other hand, does not provide a straightforward way to take advantage of this method.

Figure 8A:
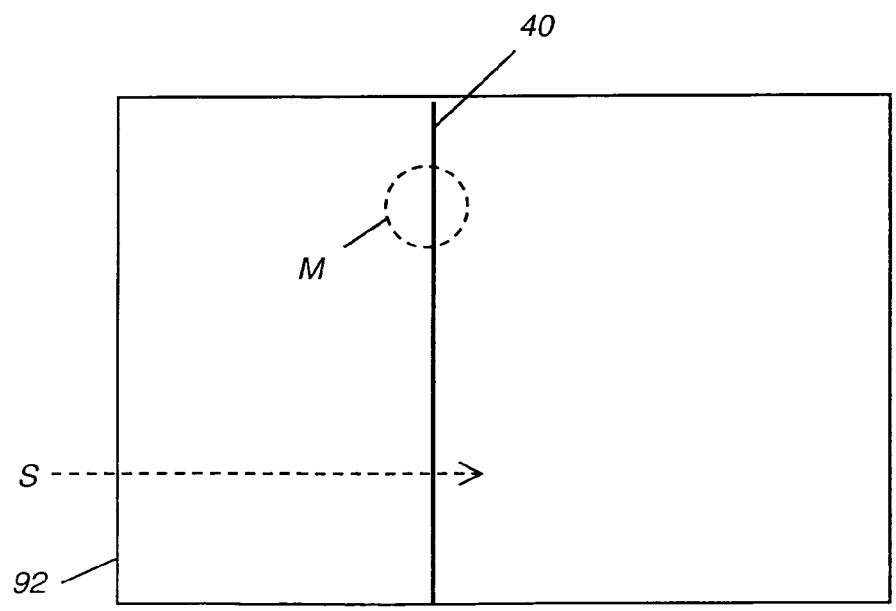
FIG. 8A is a plan view showing a single line projected onto a display screen, where the line has multiple orders of diffracted light.
Figure 8B:
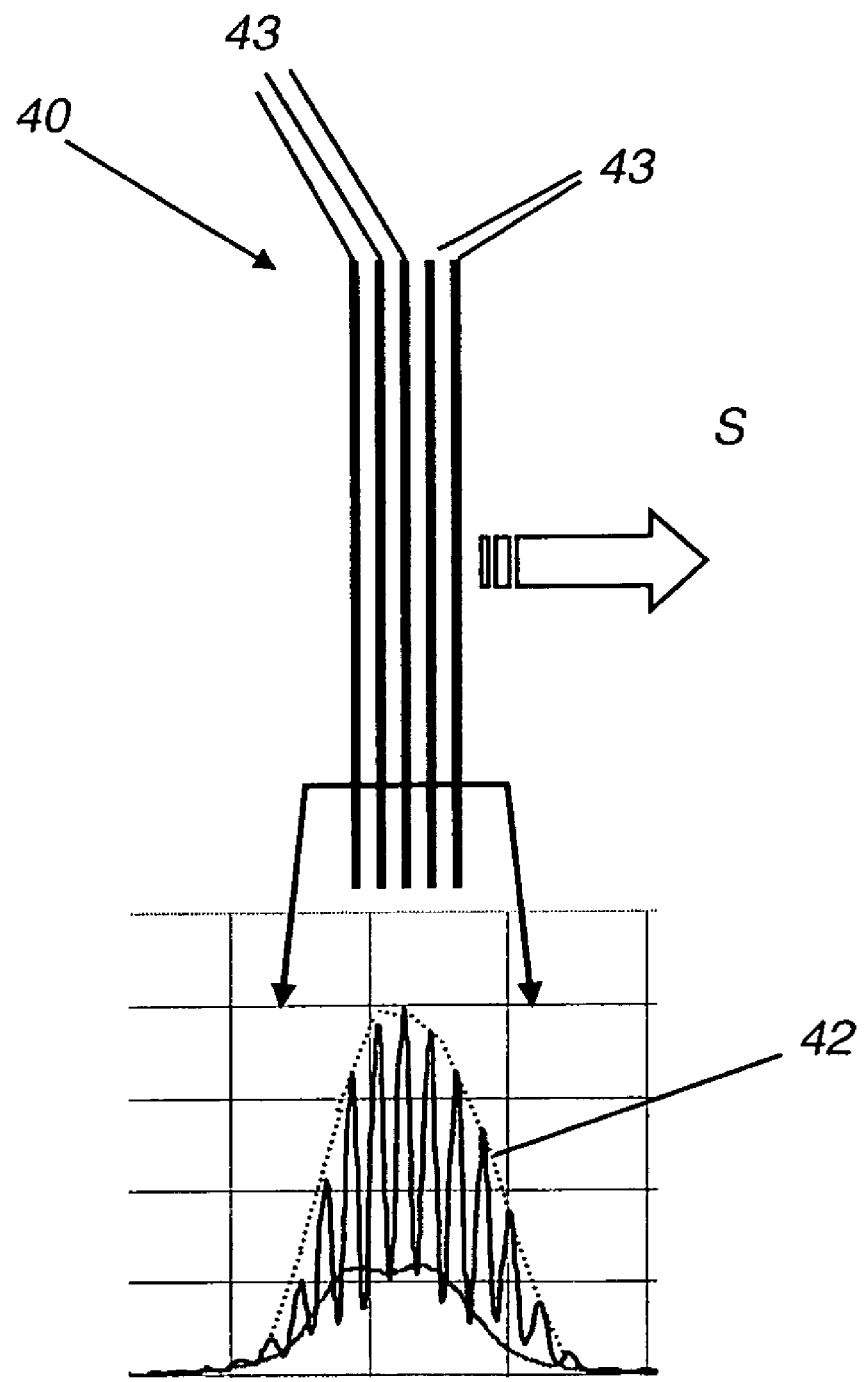
FIG. 8B is a plan view relating speckle fringe characteristics to a single projected line.

Referring to the plan view diagram of FIG. 8A, there is shown a single line of modulated light 40 scanned onto a display screen 92 with scan direction S shown as perpendicular to line 40. Section M of line of modulated light 40 is magnified and represented in simplified form in FIG. 8B. As shown in the graph of FIG. 8B, line 40 can be characterized as having interference fringes 43 within an intensity envelope 42. This is a result of modulation of the illumination profile at one or more GEMS modulators. Typically, intensity envelope 42 is Gaussian as shown in FIG. 8B, due to the Gaussian nature of spatially coherent laser beams. Interference fringes 43 arise due to interference among multiple diffracted orders. Multiple interference fringes 43 of projected line 40 create a high frequency pattern in a direction that is perpendicular to line 40.

Briefly stated, the greater the number of diffracted orders that are used to form each image line 40, the lower the speckle. Anamorphic conditioning of scanned line 40 takes advantage of the additional number of diffracted orders by reducing the relative spacing of interference fringes 43 and reducing the overall width of intensity envelope 42.

In order to better understand how this principle works, it is instructive to review how each line of the projected image is formed. With electromechanical grating devices in general, the bulk of the energy of the diffracted light is in the first order (+1, −1) components. Higher order components (for example, orders +/−2, +/−3, +/−4, and so on) typically have smaller and smaller amounts of light energy. The distribution of energy in +/−1 and higher orders is a factor of variables that include device geometry, height, and pitch, incident light wavelength, and other factors, as disclosed in a paper by Marek W. Kowarz, John C. Brazas, Jr., and James G. Phalen entitled "Conformal Grating Electromechanical System (GEMS) for High-speed Digital Light Modulation", presented at the IEEE 15$^{th}$ International Conference on MEMS (2002), incorporated herein by reference, and hereinafter termed the Kowarz paper.

For ease of understanding, descriptions of GEMS and GLV modulation given in the patent literature, cited hereinabove, typically use a first approximation, and generally confine themselves to a discussion of very few orders of diffracted light. For example, FIG. 1 traces light paths for only two diffracted orders (+/−1) at each electromechanical grating light modulator 85. However, some a mount of energy is also distributed in higher orders, above +/−1. In general, with existing designs, these higher orders have reduced light energy; in some cases, the amount of energy in orders above the +/−2 orders is so low that it can be ignored in first approximation analysis.

Figure 9A:
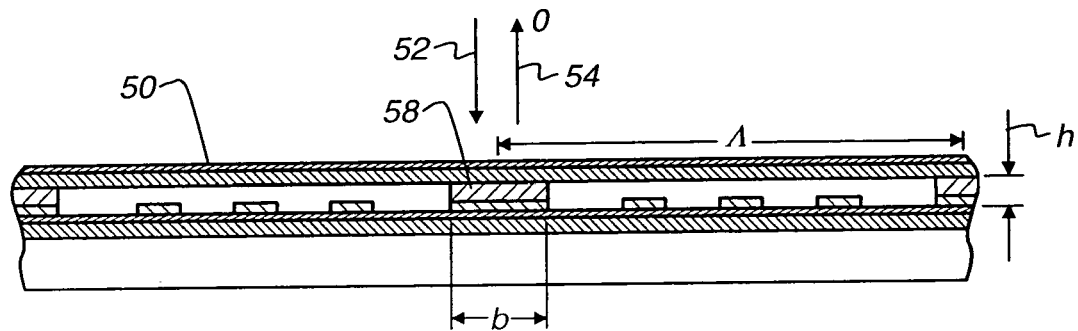
FIGS. 9A and 9B are cross-sectional views showing key features and dimensions of a single electromechanical grating device.
Figure 9B:
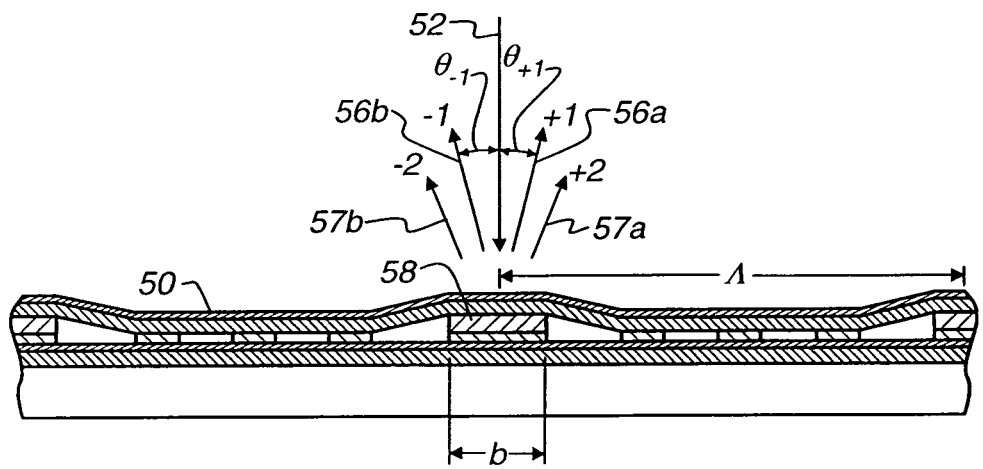

It is possible, however, to design electromechanical grating light modulator 85 with a different distribution of light energy among its diffracted orders. The Kowarz paper cited above describes in detail the computation of diffraction efficiency $\eta_m$ for each mth order diffracted beam from a given device structure. The cross-sectional side views of FIGS. 9A and 9B show an electromechanical conformal grating ribbon 50 in unactuated and actuated states, respectively, showing dimensions of particular interest for influencing diffraction efficiency. In the unactuated state of FIG. 9A, an incident light beam 52 is primarily reflected back as a reflected beam 54. In the actuated state of FIG. 9B, incident light beam 52 is diffracted into first order beams 56*a* and 56*b*, second order beams 57*a* and 57*b*, and higher order diffracted beams (not shown in FIG. 9B).

For incident light of a given wavelength, the following dimensions, as shown in FIGS. 9A and 9B, contribute to diffraction efficiency $\eta_m$ for each mth order diffracted beam:

A—the period of the grating;

b—the width of an intermediate support 58;

h—the maximum depth or vertical displacement of the conformal grating device.

Figure 10A:
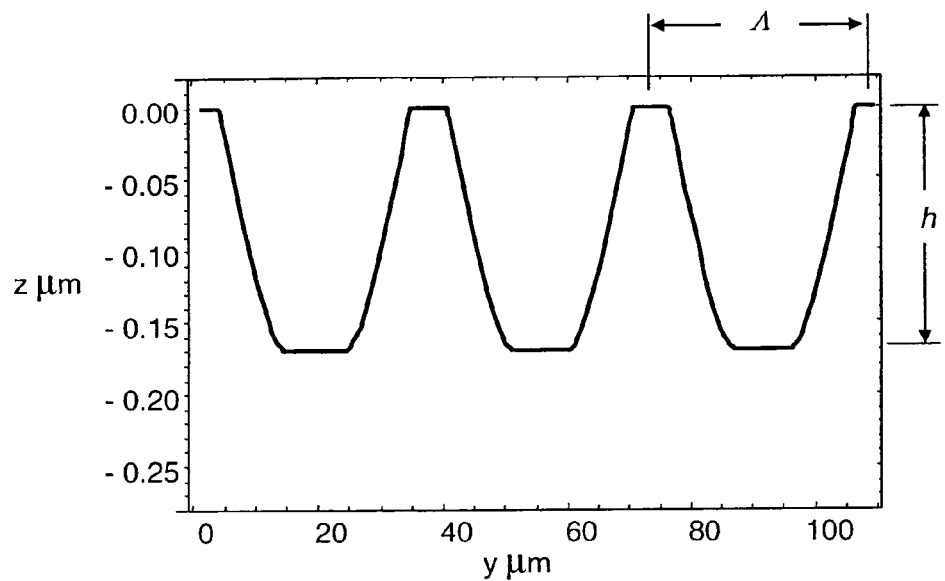
FIGS. 10A and 10B show device profile and intensity distribution data for an electromechanical grating device in one embodiment.
Figure 10B:
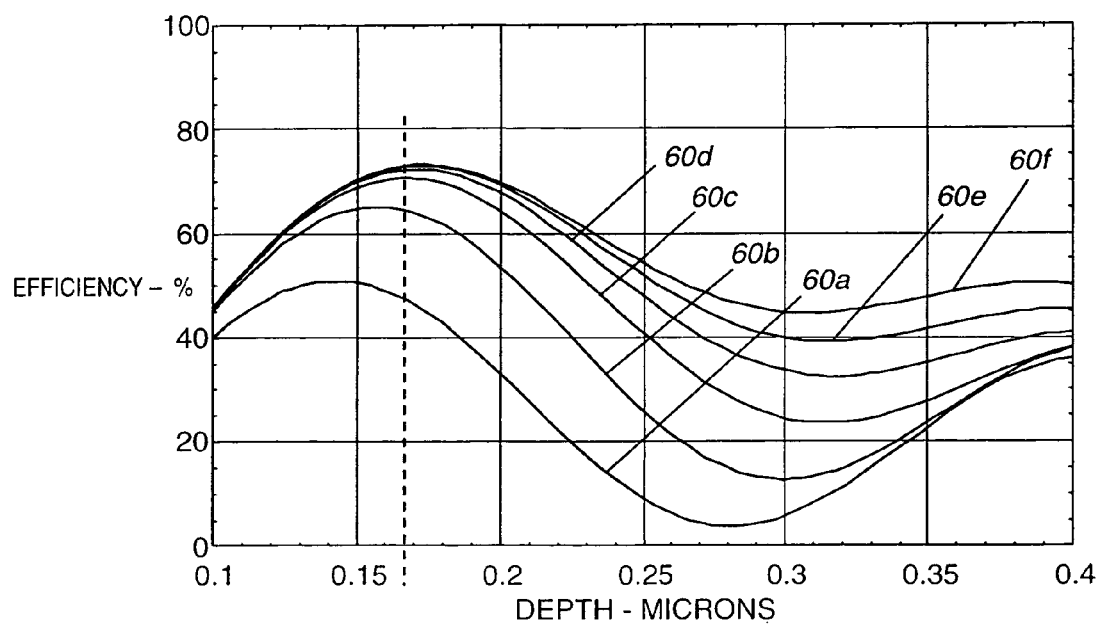

FIG. 10A shows a typical profile for a GEMS device, at a reference wavelength of 532 nm. Here, the period A of the grating is 36 μm. The depth h is approximately 0.17 μm. The graph of FIG. 10B shows % efficiency for this device at the given depth, indicated by a dashed vertical line. Here, overall diffraction efficiency is high, at about 70%. Curves 60*a*–60*f* in this graph show the accumulative efficiency for a specified number of diffracted orders, as follows:

Curve 60*a* shows total efficiency for −1, +1 orders;

Curve 60*b* shows total efficiency for −1, +1 orders and −2, +2 orders;

Curve 60*c* shows total efficiency for −1, +1 orders and −2, +2 orders and −3, +3 orders;

Curve 60*d* shows total efficiency for −1, +1 orders and −2, +2 orders and −3, +3 orders and −4, +4 orders;

Curve 60*e* shows total efficiency for −1, +1 orders and −2, +2 orders and −3, +3 orders and −4, +4 orders and −5, +5 orders; and, Curve 60f shows total efficiency for −1, +1 orders and −2, +2 orders and −3, +3 orders and −4, +4 orders and −5, +5 orders and −6, +6 orders.

While the geometry represented in FIG. 10A provides a GEMS design having high efficiency, a significant portion of the overall efficiency is contributed by first (−1, +1) and second (−2, +2) orders.

Figure 11A:
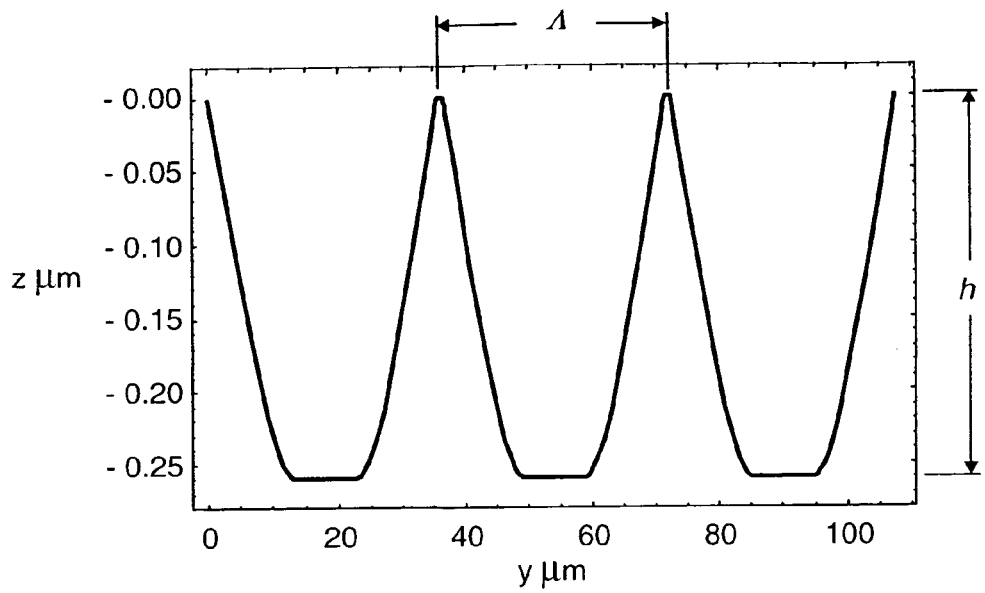
FIGS. 11A and 11B show device profile and intensity distribution data for an electromechanical grating device in an alternate embodiment.
Figure 11B:
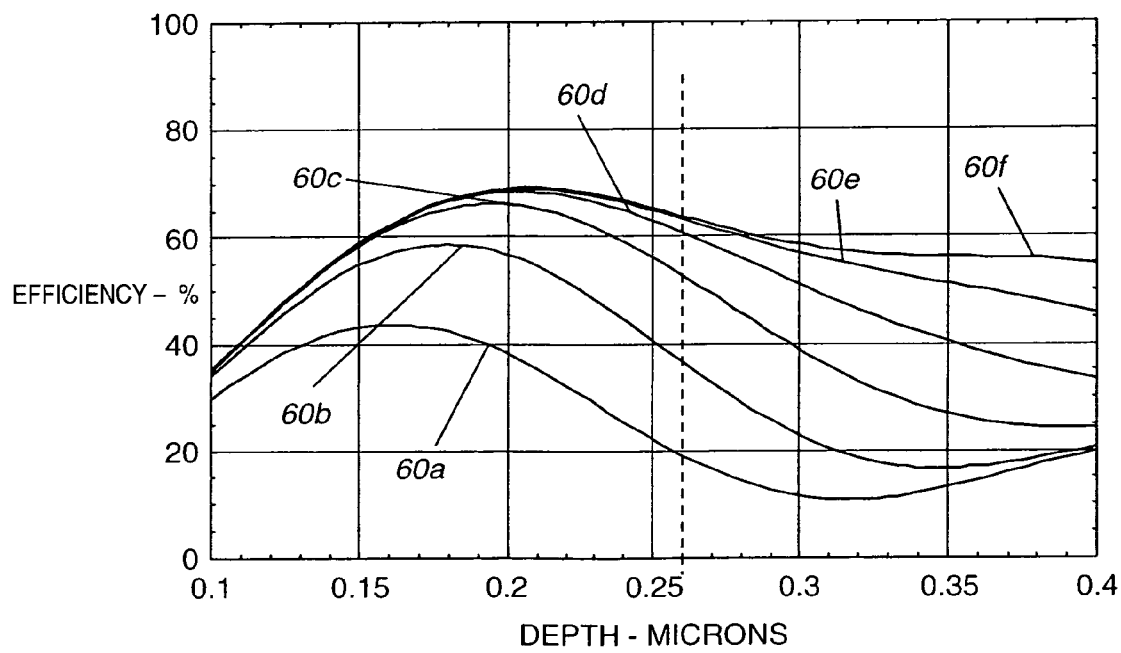

By comparison, FIG. 11A shows a GEMS design that is somewhat less efficient overall, but has a different distribution of light between diffracted orders. FIG. 11B shows % efficiency for this device at the given depth, again indicated by a dashed vertical line. As is shown in FIG. 11A, the contribution of −1, +1 orders with this alternate geometry is less than about ⅓ of the total efficiency; in FIG. 10A, by comparison, the −1, +1 orders contributed nearly ⅔ of the total efficiency.

As is noted above, the inventors attribute perceptible reductions in speckle to an intensity distribution arrangement such as that shown in FIG. 11B. That is, by increasing the intensity in higher diffracted orders using GEMS designs, a measure of speckle reduction can be achieved. In most cases of interest, the speckle contrast reduction when using multiple diffracted orders can be approximated by:

$$\frac{\sqrt{\sum_m \eta_m^2}}{\sum_m \eta_m}$$

where $\eta_m$ is the efficiency (or intensity) of the mth order light. Using this calculation, it can be seen that with two diffracted orders of equal intensity, the speckle contrast reduction is $$\frac{1}{\sqrt{2}}$$

that of the single order speckle. However, each additional diffracted order tends to increase this reduction factor.

Figure 3:
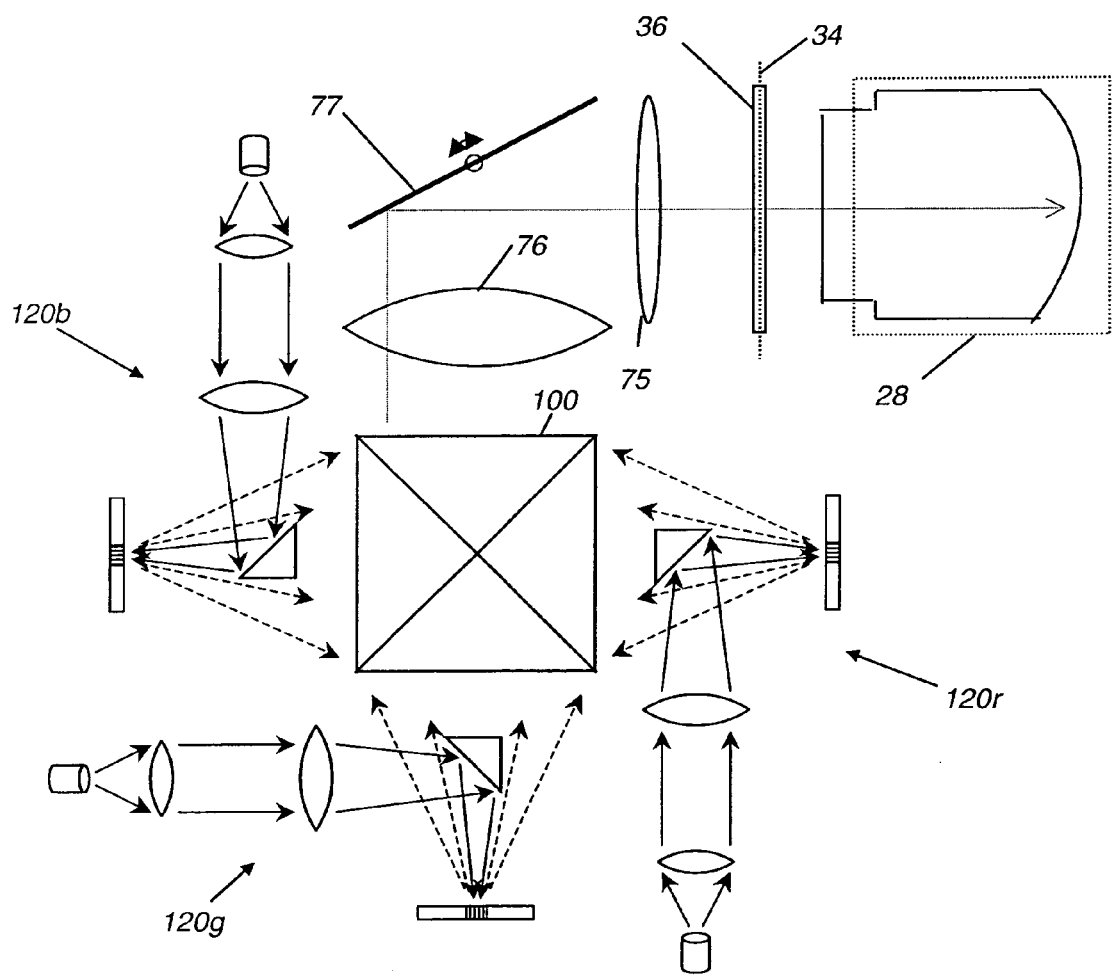
FIG. 3 is a schematic block diagram showing the arrangement of a display apparatus in another embodiment of the present invention.

Thus, it has been found that speckle can be reduced not only by using multiple diffracted orders, as was described with reference to FIGS. 8A and 8B and using anamorphic distortion as was shown in FIGS. 2 and 3, but also by changing the energy distribution in these diffracted orders. Thus, for example, electromechanical grating light modulator 85 could be designed to provide brightness for +/−2 diffracted orders at 0.5 times the brightness of +/−1 orders, rather than at the factor of 0.2 or less that is typical with GEMS devices. It would be possible, for example, to design electromechanical grating light modulator 85 to provide more than half of the intensity of diffracted light in its second and higher orders, so that the intensity of first order (+/−1 order) light is less than or equal to the summed intensity of second order and higher order light. That is:

$$\eta_1 \leq \sum_{m=2}^{\infty} \eta_m.$$

Figure 4:
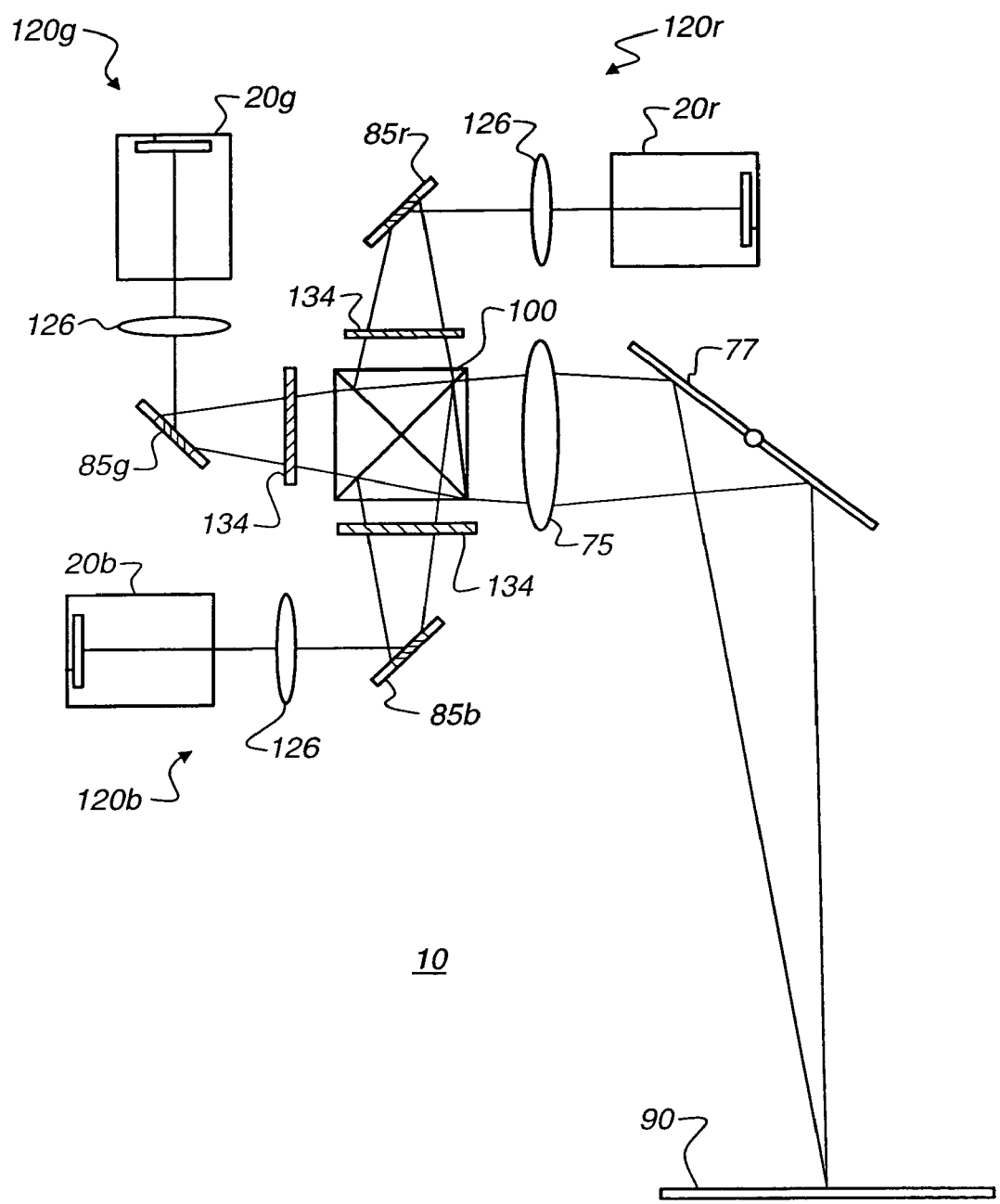
FIG. 4 is a schematic block diagram showing a display apparatus employing an electromechanical grating light modulator in each of three color modulation channels.

Referring to display system 10 in FIG. 4, there is shown an arrangement of components capable of selecting the desired diffracted orders of light in each color light modulation path. Illumination from red, green, and blue light sources 20r, 20g, and 20b in their respective red, green, and blue modulation assemblies 120r, 120g, and 120b is modulated at corresponding red, green, and blue electromechanical grating light modulators 85r, 85g, and 85b. In each color path, a modulated light spatial filter 134 is disposed, prior to color combiner 100. In operation, modulated light spatial filter 134 blocks the unwanted zeroeth ($0^{th}$) order reflected light and transmits one or more orders of diffracted light. It should be noted that it is not a requirement that modulated light spatial filter 134 be placed at the focal plane of lens 126. The arrangement of FIG. 4 eliminates the need for turning mirror 82r, 82g, and 82b components for directing illumination onto the electromechanical grating light modulators 85r, 85g, and 85b, respectively.

Embodiments Using Multiple Coherent Light Beams

Another method for increasing the number of diffracted orders employs an illumination arrangement with multiple input laser beams, or a laser beam split into multiple sub-beams. Referring to FIG. 6, there is shown an embodiment of components in a modulation assembly 120 that uses a split beam for illumination. Light source 70, typically a laser or other coherent emitter, directs its output beam through beam shaping optics 140 and to a beam divider 142, such as a grating. Beam divider 142 splits the illuminating beam into illumination beam components 148A and 148B, which are directed by a lens 144 toward electromechanical grating light modulator 85. Each illumination beam component 148A and 148B provides separate reflected $0^{th}$ orders and separate modulated diffracted orders (+/−1, +/−2, +/−3, etc.) The modulated light from electromechanical grating light modulator 85 is then directed to modulated light spatial filter 134, which has an arrangement such as that shown in FIG. 5. Here, modulated light spatial filter 134 is in two sections: A for handling light from illumination beam component 148A in FIG. 6, and B for handling light from illumination beam component 148B in FIG. 6. The $0^{th}$ order is blocked by an obstructing element 136 for each illumination beam component 148A and 148B. The +/−1 and +/−2 orders are transmitted through modulated light spatial filter 134 and can be scanned and projected in the usual manner. Using modulated light spatial filter 134 in this manner effectively provides two sets of diffracted orders: an "A" set of +/−1 and +/−2 orders and a "B" set of +/−1 and +/−2 orders. In the same way, using a larger number of illumination beams would result in additional sets of diffracted orders.

Figure 5:
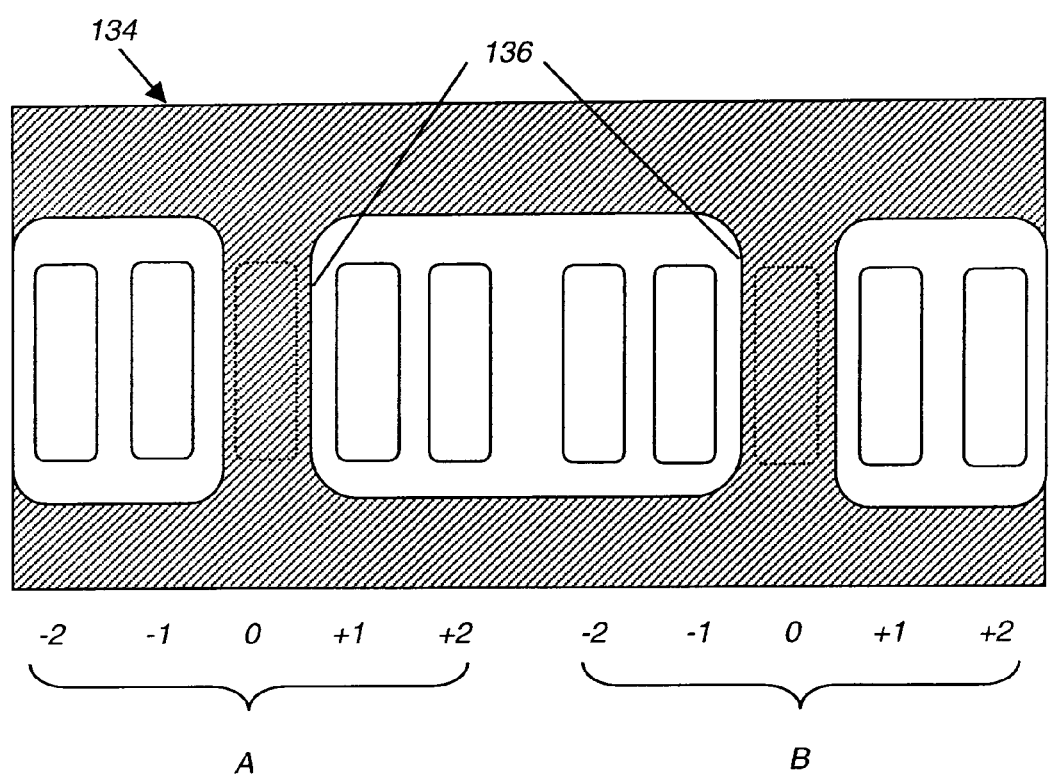
FIG. 5 is a plan view showing a blocking apparatus for transmitting multiple desired orders of diffracted light from each pixel on a linear electromechanical grating device.
Figure 6:
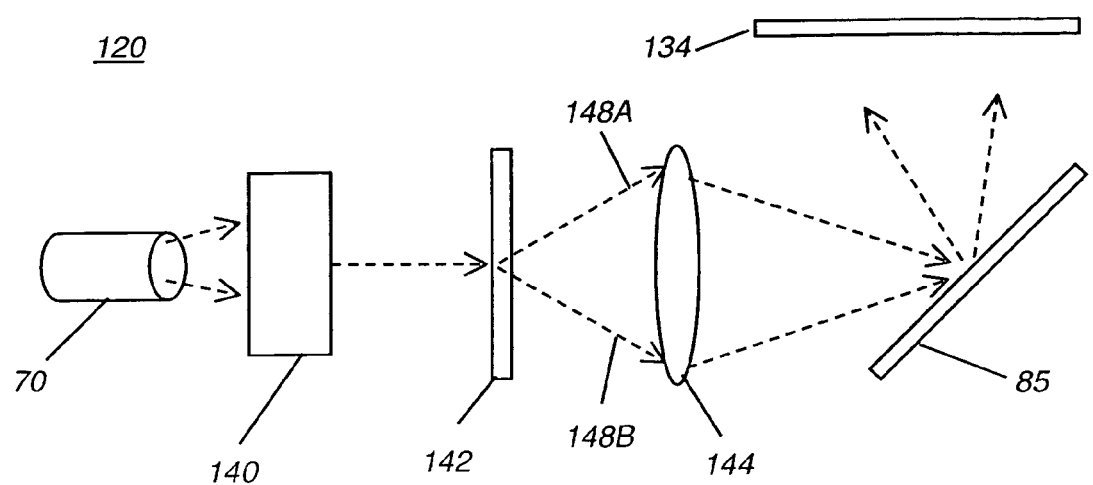
FIG. 6 is a schematic block diagram showing the components of a color modulation assembly in an alternate embodiment.

For speckle reduction, the arrangement of FIGS. 5 and 6 effectively doubles the available number of diffracted orders of modulated light from electromechanical grating light modulator 85. In addition, as is shown in FIG. 6, an angular difference between the two illumination beam components 148A and 148B, favorable for speckle reduction, is provided. In another embodiment, light sources 20r, 20g, and 20b may consist of VCSEL arrays, each array providing multiple illumination beams. Alternatively, separate lasers or other light sources 70 might be provided, disposed to direct incident illumination to electromechanical grating light modulator 85 at different angles.

The technique described with reference to FIGS. 5 and 6 can be applied to other types of linear modulators, such as GLV types, as well as to GEMS modulators. Using a grating for beam divider 142 could provide diffracted orders in the scan direction that the GLV device does not inherently provide, but which have been shown advantageous for reducing speckle. In such a case, the Schlieren technique normally used to filter GLV diffracted orders would need to be modified in order to select the appropriate diffracted orders.

It must be observed that the method of producing multiple modulated beams, described above with reference to FIG. 6, can be combined with methods for decreasing the effective f-number of the modulated light, described above with reference to FIGS. 2 and 3. Such a combination would add angular characteristics to the modulated light that are favorable for reducing speckle.

It must also be observed that other techniques could be employed in order to provide two or more illumination beams. For example, two or more separate lasers could be used. Alternately, beam divider 142 could provide more than the two illumination beam components 148A and 148B shown in FIG. 6. Where different lasers or other light sources are used for simultaneous illumination of a single linear light modulator, these light sources should be substantially the same color, varying from each other by not more than about 20 nm in wavelength. Multiple light sources should provide light at a substantially equal intensity, varying from each other by not more than about +/−30%.

Combinations with Other Speckle Reduction Techniques

Figure 7:
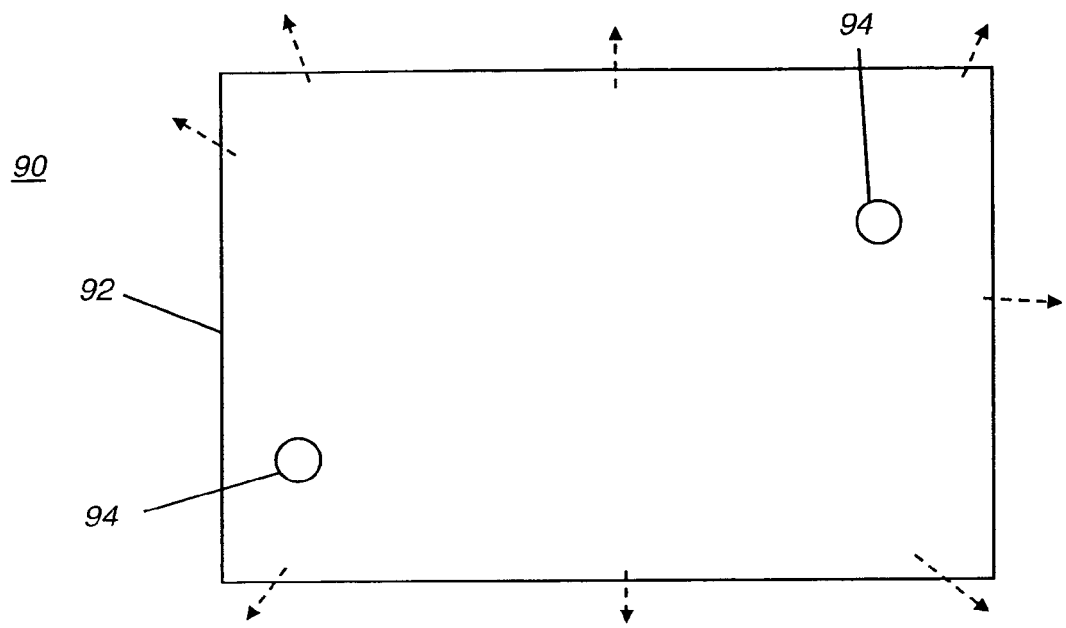
FIG. 7 is a plan view showing a display screen having optional acoustic actuators according to one embodiment.

The basic thrust of the techniques of the present invention is to reduce speckle effects by changing the intensity distribution of higher order diffracted light and by projection methods that use higher order light more effectively. These techniques can be combined with other approaches to speckle reduction that modify the spatial or temporal coherence or that condition the polarization state of the incident illumination or of the modulated light output. For example, vibration of the display screen can be used in addition to the approach shown in FIGS. 2–6. In this case, in addition to having modulated image line 40 scanned across the speckle area in time, the speckle area is itself moved in time with local motions of display surface 90. This combination of techniques works to further reduce the time-averaged speckle visibility. Referring to FIG. 7, there is shown display surface 90 having a screen 92 that is maintained under tension, somewhat like a drumhead. One or more actuators 94 are provided to impart vibration to screen 92. Suitable actuators 94 could be voice coils operated in the sub-audible range, such as at about 15 Hz, for example. It is desirable to minimize the area of nulls in vibration that could result; techniques for forming traveling waves would be favorable for this purpose. In addition to the screen vibration method shown in FIG. 7, other conventional speckle reduction techniques could be employed, such as the use of diffusers in the path of modulated light. However, it must be observed that, where multiple speckle reduction techniques are used simultaneously, their respective contributions to the effective speckle reduction are not linear.

For color devices, speckle is most noticeable in the green color channel. Thus, it may be advantageous to apply speckle reduction techniques noted hereinabove to only a green modulation assembly 120g (FIGS. 1–4).

The methods disclosed herein cannot be applied in the same way to all types of electromechanical grating light modulators 85. For example, forming a line image having multiple diffracted orders in the scan direction is straightforward with a GEMS device. However, the GLV device does not direct its modulated light to the display surface in the same manner and thus would not be suitable for this method. The GEMS technology can be adapted for shifting some portion of intensity to higher order diffracted light. However, the GLV device operates differently and would require different solutions for improving the utilization of higher order diffracted light to reduce speckle.

The apparatus and methods of the present invention enable the use of highly coherent illumination for display purposes, substantially reducing the effects of speckle.

Thus, what is provided is an improved display apparatus and method using an electromechanical grating light modulator to provide high-quality imaging having reduced speckle.

The invention has been described with reference to a preferred embodiment. However, it will be appreciated that a person of ordinary skill in the art can effect variations and modifications without departing from the scope of the invention. For example, the function of scanning mirror 77 in FIGS. 2–4 could be accomplished using some other type of scanning element or device. Figures used in this specification have been deliberately simplified, to simplify the description of the invention. Additional optical components would be needed in most embodiments, as would be clear to one skilled in the optical design arts. For example, various arrangements of lenses could be used for directing light in each optical path in a typical application. Color embodiments would combine the methods of the present invention with conventional color combination techniques.

PARTS LIST

10 Display system
20r, 20g, 20b Light source
28 Projection lens
30 Angle-transforming optical assembly
32 Half-wave plate
34 Intermediate image plane
36 Diffuser
40 Line
42 Intensity envelope
43 Interference fringe
50 Conformal grating ribbon
52 Incident light beam
54 Reflected beam
56a, 56b First order beam
57a, 57b Second order beam
58 Intermediate support
60a, 60b, 60c, 60d Curve
70, 70r, 70g, 70b Light source; Light source, red; Light source, green; Light source, blue.
72r, 72g, 72b Spherical lens; Spherical lens, red; Spherical lens, green; Spherical lens, blue
74r, 74g, 74b Cylindrical lens; Cylindrical lens, red; Cylindrical lens, green; Cylindrical lens, blue
75, 76 Lens
77 Scanning mirror
82r, 82g, 82b Turning mirror, red; Turning mirror, green; Turning mirror, blue
85 Electromechanical grating light modulator
85r, 85g, 85b Electromechanical grating light modulator, red; Electromechanical grating light modulator, green; Electromechanical grating light modulator, blue
90 Display surface
92 Screen
94 Actuator
100 Color combiner
110 Cross-order filter
120, 120r, 120g, 120b Modulation assembly; Modulation assembly, red; Modulation assembly, blue; Modulation assembly, green 134 Modulated light spatial filter
136 Obstructing element
140 Beam shaping optics
142 Beam divider
144 Lens
148A, 148B Illumination beam components

What is claimed is:

1. A method for displaying an image with reduced speckle, comprising the steps of:
   a) forming at least three linear light beams by diffraction at a single linear light modulator including a linear array of light modulating devices, wherein the at least three linear light beams have substantially equal intensity and are substantially the same color;
   b) projecting the at least three linear light beams toward a display surface to form a line image wherein an angle separating any two of the at least three linear light beams is in a plane that is substantially perpendicular to the longest axis of the linear light modulator; and,
   c) scanning the line image across the display surface to form an image.

2. The method according to claim 1 further comprising the step of imparting a vibration to the display surface.

3. The method according to claim 1 wherein the intensities of the at least three light beams are equal to within +/−30 percent.

4. The method according to claim 1 wherein the intensities of the at least three light beams are equal to within +/−20 percent.

5. The method according to claim 1 wherein the at least three light beams are in the green visible spectrum.

6. The method according to claim 1, wherein wavelengths of the at least three light beams are substantially equal in value.

7. A display system comprising:
   a) a light source providing a substantially coherent illumination beam;
   b) a linear light modulator comprising at least one linear array of light modulating devices for forming a modulated beam from the illumination beam, wherein the modulated beam comprising a plurality of orders of diffracted light from the illumination beam; and wherein the intensity of first order diffracted light is less than or equal to the summed intensity of second and higher order diffracted light.

8. The display system according to claim 7 wherein the intensity of the second order diffracted light is greater than or equal to one half of the intensity of the first order diffracted light.

9. The display system according to claim 7 further comprising a scanning element for scanning the modulated beam in a scan direction.

10. The display system according to claim 9 further comprising an angle-transforming optical assembly for providing anamorphic shaping of the modulated beam in the scan direction.

11. The display system according to claim 7 wherein the light source is a laser.

12. The display system claimed in claim 7 wherein the linear light modulator comprises an electro-mechanical grating device.

13. The display system claimed in claim 7 wherein the linear light modulator comprises an electromechanical conformal grating device.

14. The display system claimed in claim 7 further comprising a half-wave plate in the path of a portion of the modulated beam.

15. The display system claimed in claim 7 further comprising a diffusing element in the path of the modulated beam.

16. The display system claimed in claim 7 further comprising an actuator mechanically coupled to a display surface for inducing vibration to the display surface.

17. The display system claimed in claim 7 wherein the light source is in the green visible spectrum.

18. A linear light modulator for providing reduced speckle, comprising:
   a) at least one linear array of light modulating devices for forming a modulated beam from an illumination beam, and
   b) the modulated beam comprising a plurality of orders of diffracted light from the illumination beam, wherein the intensity of first order diffracted light is less than or equal to the summed intensity of second and higher order diffracted light.

19. The linear light modulator according to claim 18 wherein the intensity of the second order diffracted light is greater than or equal to one half of the intensity of the first order diffracted light.

20. The linear light modulator according to claim 18 comprising an electromechanical conformal grating device.

21. The linear light modulator according to claim 18 wherein the angle between any two of the plurality of orders of diffracted light in the modulated beam is in a plane that is perpendicular to the longest axis of the linear light modulator.

22. The linear light modulator according to claim 18 wherein the illumination beam is in the green visible range.

23. A linear light modulator for providing reduced speckle, comprising:
   a) at least one linear array of light modulating devices for forming a modulated beam from an illumination beam,
   b) the modulated beam comprising a plurality of orders of diffracted light from the illumination beam, wherein the intensity of a second order diffracted light is greater than or equal to one half of the intensity of a first order diffracted light.

24. A linear light modulator according to claim 23 wherein the intensity of a first order diffracted light is less than or equal to the summed intensity of second and higher order diffracted light.

* * * * *